(12) United States Patent
Naito et al.

(10) Patent No.: US 8,723,061 B2
(45) Date of Patent: May 13, 2014

(54) MEMS SWITCH AND COMMUNICATION DEVICE USING THE SAME

(75) Inventors: Yasuyuki Naito, Osaka (JP); Jan Bienstman, Kessel (BE); Xavier Rottenberg, Schaarbeek (BE); Hendrikus A. C. Tilmans, Maasmechelen (BE)

(73) Assignees: Panasonic Corporation, Osaka (JP); IMEC, Leuven (BE)

( * ) Notice: Subject to any disclaimer, the term of this patent is extended or adjusted under 35 U.S.C. 154(b) by 245 days.

(21) Appl. No.: 13/265,970

(22) PCT Filed: Aug. 26, 2010

(86) PCT No.: PCT/JP2010/005268
§ 371 (c)(1),
(2), (4) Date: Oct. 24, 2011

(87) PCT Pub. No.: WO2011/033728
PCT Pub. Date: Mar. 24, 2011

(65) Prior Publication Data
US 2012/0055769 A1 Mar. 8, 2012

(30) Foreign Application Priority Data
Sep. 17, 2009 (JP) ................. P2009-215842

(51) Int. Cl.
*H01H 57/00* (2006.01)

(52) U.S. Cl.
USPC ............................................. 200/181; 335/78

(58) Field of Classification Search
USPC ............................................. 200/181; 335/78
See application file for complete search history.

(56) References Cited

U.S. PATENT DOCUMENTS

| 6,787,438 | B1 * | 9/2004 | Nelson ................. 438/584 |
| 7,161,273 | B2 * | 1/2007 | Akiba et al. ............. 310/309 |
| 7,362,199 | B2 * | 4/2008 | Chou et al. ............. 335/78 |
| 8,217,738 | B2 * | 7/2012 | Naito ................. 335/78 |
| 2002/0163408 | A1 | 11/2002 | Fujii et al. |

(Continued)

FOREIGN PATENT DOCUMENTS

| JP | 2003-136496 | 5/2003 |
| JP | 2004-127871 | 4/2004 |

(Continued)

OTHER PUBLICATIONS

International Search Report issued Nov. 30, 2010 in International (PCT) Application No. PCT/JP2010/005268.
English translation of International Preliminary Report on Patentability issued Apr. 19, 2012 in International (PCT) Application No. PCT/JP2010/005268.

*Primary Examiner* — Xuong Chung Trans
(74) *Attorney, Agent, or Firm* — Wenderoth, Lind & Ponack, L.L.P.

(57) ABSTRACT

A MEMS switch in which contact force sufficient to make a contact having low contact resistance is maintained after contact-formation to maintain low contact resistance at the contact where the signal is transmitted in an "on" state. The MEMS switch includes a first electrode, a second electrode opposed to and separated from the first electrode, a third and a fourth electrodes, wherein electrical contact is made between the electrodes by electrostatic force generated between the electrodes, and a bump which can form the contact between the electrodes is provided on an electrode, and a gap is formed between the electrodes when the electrical contact is made between the electrodes.

16 Claims, 6 Drawing Sheets

(56) References Cited

U.S. PATENT DOCUMENTS

2003/0102771 A1  6/2003  Akiba et al.
2005/0280975 A1  12/2005  Iwata et al.
2008/0283374 A1  11/2008  Naito

FOREIGN PATENT DOCUMENTS

| JP | 2006-269127 | 10/2006 |
| JP | 2008-311225 | 12/2008 |
| WO | 01/82323 | 11/2001 |

* cited by examiner

MEMS SWITCH AND COMMUNICATION DEVICE USING THE SAME

BACKGROUND OF INVENTION

1. Technical Field

The present invention relates to a MEMS switch which is one of microelectromechanical systems and a communication device using the same.

2. Background Art

Microelectromechanical system (which may be abbreviated to "MEMS") can fulfill various functions in wide-ranging fields such as wireless technologies, optical technologies, acceleration sensors and biotechnologies. MEMS, in particular, is favorably used in a device such as a switch and a filter for a wireless terminal.

As an information and communication device such as a wireless terminal is being in widespread use, a small-sized terminal that is accommodated to various communication systems is required. In addition, it is recently desired to downsize a passive component since there is a tendency of increase in the number of the passive components, such as a switch, which are built in a housing of the terminal.

A radio-frequency microelectromechanical system (RF-MEMS) switch, which is manufactured using a MEMS technology, is regarded as a favorable component to satisfy these demands. The RF-MEMS switch is a switch wherein a micro movable electrode is moved to mechanically switch a transmission path of a signal. The advantage of the RF-MEMS switch is excellent radio-frequency characteristics such as ultra-low insertion loss, high isolation, linearity and so on. Further, since the MEMS switch can be produced by a process compatible to a semiconductor, the MEMS switch can be built in an RF-IC. For these reasons, the development of the MEMS switch is expected to be a technology which significantly contributes to downscaling of the wireless segment.

The conventional RF-MEMS switch mechanically switches the transmission path of signal by contacting a membrane or bar movable body having a fixed-fixed beam construction or a cantilever construction with an electrode, or separating the movable body from the electrode. Many conventional RF-MEMS switches use electrostatic force as a source of driving force for the movable body. The RF MEMS switch wherein electromagnetic force is used as a source of driving force has been proposed.

There is a series-type switch as one type of the RF-MEMS switches. The series-type RF-MEMS has a movable electrode and a driving electrode. The movable electrode, which is a micro membrane with a length of several hundreds μm, is located on extension of the signal line for transmitting an RF signal and is separated from a signal electrode. A tip of the movable electrode is open. The driving electrode is provided just beneath the region where the membrane of the movable electrode is not located. When a DC potential is applied to the driving electrode, the movable electrode is attracted to the driving electrode side by the electrostatic force, and then contacted with the signal line which outputs the signal. The short circuit is established between the signal lines and the RF signal is transmitted through the movable electrode (that is, "on" state is established). When the DC potential is not applied to the driving electrode, the movable electrode does not contact with the signal line and thereby the RF signal is blocked (that is, "off" state is established).

Figure 5:
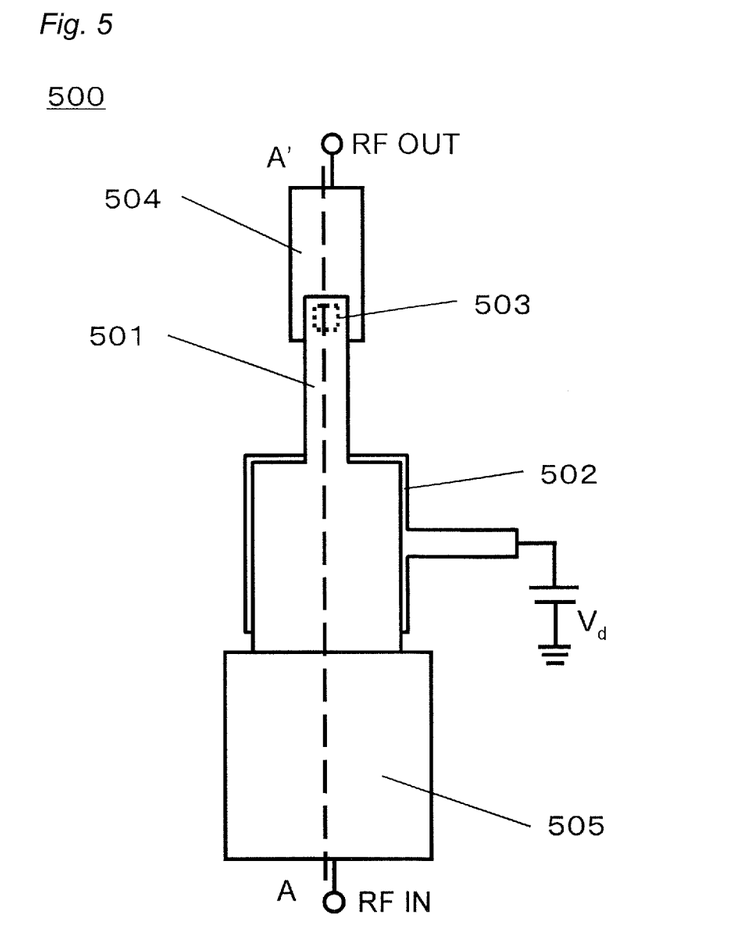
FIG. 5 is a top view showing a construction of a conventional MEMS switch.
Figure 6:
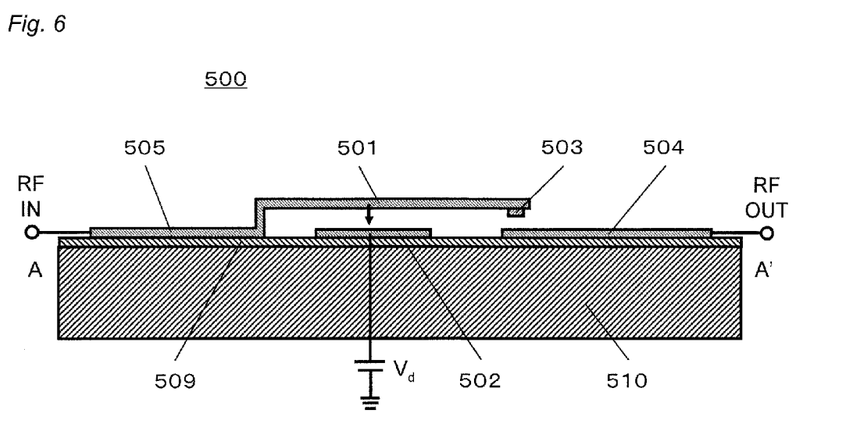
FIG. 6 is a cross-sectional view along a line A-A' in FIG. 5.

An example of a construction of the conventional series-type MEMS switch is described with reference to FIGS. 5 and 6. FIG. 5 is a top view showing an example of the conventional MEMS switch, and FIG. 6 is a cross-sectional view showing the A-A' section in FIG. 5.

In the MEMS switch 500 shown in the figure, an insulating layer 509 is formed as an interlayer insulating film on a substrate 510, and a driving electrode 502 and a signal electrode 504 as the transmission path are formed on the insulating layer 509. A movable electrode 501, which has a contact electrode (membrane) 503 and is supported by a support 505, is provided such that the electrode 501 is opposed to and separated from the electrodes 502 and 504. The movable electrode 501 is a deformable member and formed on only one side when viewed from the contact electrode 503 (that is, the electrode 501 is a cantilever beam). The switch of this construction is made "on" by applying the electrostatic force between the movable electrode 501 and the driving electrode 502 to electrically contact the contact electrode 503 with the signal electrode 504.

Further, an electrostatic type relay is disclosed in Patent Document 1, as another embodiment of the microelectromechanical system switch. The switch disclosed in Patent Document 1 is of a construction wherein the movable electrode which is elastically supported is made into surface contact with a fixed electrode by the electrostatic force.

BACKGROUND ART DOCUMENT

Patent Document

Patent Document 1: WO 01/82323

SUMMARY OF INVENTION

Currently contact resistance at a contact, where the signal is transmitted, is required to be kept low in order to achieve the low insertion loss in the switching "on" state. To this end, sufficient contact force for low contact resistance is required to be kept after the contact is made (that is, during the "on" state).

In the MEMS switch shown in FIGS. 5 and 6, the movable electrode 501 is warped to almost contact with the driving electrode 502 in the "on" state. Thereby, the contact electrode 503, which is to contact with the signal electrode 504, is inclined due to the warp of the driving electrode 501 to contact with the signal electrode 504. As a result, the biased contact force is applied to the contact between the contact electrode 503 and the signal electrode 504, which causes the problem that the contact force is not exerted to the entire contact. Further, floating state may be caused wherein a part of the contact electrode 503 does not contact with the signal electrode 504. In that case, the contact force exerted by the contact electrode 503 to the signal electrode 504 is applied in directions other than the direction which is vertical to a surface of the signal electrode 504, resulting in the dispersion of the contact force. In addition, the contact area is reduced due to the fact that the part of the contact electrode and the part of the signal electrode are not contacted, which is a cause of the increase in contact resistance.

In the switch of the construction disclosed in Patent Document 1, since the fixed electrodes are located on both sides of the contact, the contact force at the contact has less bias compared to that in the switch shown in FIGS. 5 and 6. However, in the switch of this construction, only spring force (elastic force) of the movable electrode is applied to the contact after the movable electrode has contacted the fixed electrode, that is, the contact force which maintains the low contact resistance is only the spring force. An increase of the contact force is desired to make a reliable contact. Further, the surface has a problem of reducing reliability due to stiction (an adhesion phenomenon).

The present invention was made in view of the above-described situation, and the object of the present invention is to provide a MEMS switch which can make a highly reliable contact.

The present invention provides a MEMS switch including a first electrode, a second electrode and a third electrode which are separated from and opposed to the first electrode, wherein an electrical contact can be made between the first electrode and the second electrode by electrostatic force generated between the first electrode and the third electrode, a bump which can form a contact between the first electrode and the third electrode is provided on one or more electrodes selected from the first electrode and the third electrode, a gap is formed between the first electrode and the third electrode when the electrical contact is made between the first electrode and the second electrode.

The MEMS switch of the present invention is characterized in that the bump which can form the contact between the first electrode and the third electrode is provided on one or more electrodes selected from the first electrode and the third electrode. When the electrical contact is made between the first electrode and the second electrode, the gap is formed between the first electrode and the third electrode due to the presence of the bump. For this reason, high contact force can be maintained by, in addition to the spring force of the first electrode, the electrostatic force which acts between the first electrode and the third electrode, after the first electrode and the second electrode contact electrically. As a result, a highly reliable contact formation which achieves the low contact resistance and the low insertion loss, is made at a low driving voltage. Further, in the MEMS switch of the present invention, a physical contact area between the first electrode and the third electrode when the first electrode and the second electrode contact with each other can be reduced, and thereby the reduction in reliability due to the stiction or the wear can be avoided.

The MEMS switch of the present invention may further include a fourth electrode which is opposed to and separated from the first electrode, and may form the electrical contact between the first electrode and the second electrode by the electrostatic force generated between the first electrode and the third electrode and between the first electrode and the fourth electrode. In the MEMS switch of this construction, the bump which can form the contact between the first electrode and the third electrode and/or between the first electrode and the fourth electrode is provided on one or more electrodes selected from the first electrode, the third electrode and the fourth electrode, and the gap is formed between the first electrode and the third electrode and/or between the first electrode and the fourth electrode when the electrical contact is formed between the first electrode and the second electrode. In other words, the bump may be formed such that the gap is formed only between the first electrode and the third electrode, or the gap is formed between the first electrode and the third electrode and between the first electrode and the fourth electrode.

In the MEMS switch having the fourth electrode in addition to the third electrode, since an area where the electrostatic force acts is larger, a greater contact force can be obtained. Further, when the electrical contact is formed between the first electrode and the second electrode, the electrostatic force acts in a larger region which encloses the electrical contact, which results in more stable contact at the contact.

The bump which can form the contact between the third electrode (when the fourth electrode is provided, the third electrode and/or the fourth electrode) and the first electrode in the MEMS switch of the present invention is preferably formed on the first electrode and able to form the contact with a floating-island electrode formed within the third electrode (when the fourth electrode is provided, the third electrode and/or the fourth electrode). The first electrode and the third electrode (when the fourth electrode is provided, the third electrode and/or the fourth electrode) are not of the same electric potential due to the presence of the floating-island electrode, whereby the electrostatic force can be maintained.

In the MEMS switch of the present invention, the number and the position of the bump are preferably selected such that the first electrode and the third electrode (the first electrode and the third electrode and/or the fourth electrode when the fourth electrode is provided) are not contacted each other directly, when the electrical contact is made. Thereby, the region of the gap can be increased. As a result, the electrostatic capacitance can be increased to increase the electrostatic force which contributes to the retention of the electrical contact when the first electrode and the second electrode contact with each other.

In the case where two or more bumps are provided in the MEMS switch of the present invention, the respective bumps are preferably formed on the respective radial lines which extend from the electrical contact. In that case, the bumps are preferably located such that the distances between the respective bumps and the electrical contact are equal. In other words, it is preferable that the bumps are located on a circle, the center of which is the electrical contact. By locating the respective bumps on the respective radial lines, the bumps are located two-dimensionally, and the movable electrode bridged over a region enclosed by the electrical contact and the bumps has not only a length but also a width, resulting in the increase in a spring amount. Further, this disposition of the bumps can ensure the gap between the first electrode and the third electrode (between the first electrode and the third electrode and/or the fourth electrode when the fourth electrode is provided) during the period when the electrical contact is formed.

In the MEMS switch of the present invention wherein two or more bump is formed on the first electrode and/or the third electrode, the number and the positions of the bumps are preferably selected such that an area of a region enclosed by the electrical contact between the first electrode and the second electrode and the bumps is 20% or more of the area where the electrostatic force acts between the first electrode and the third electrode, when the MEMS is viewed from above (in other words, in a direction in which the first electrode is moved (warped) when the first electrode and the second electrode make the electrical contact). As the region which is enclosed by the electrical contact and the bumps is larger, the electrostatic force which contributes to the retention of the electrical contact in the state wherein the first electrode and the second electrode contact, can be made larger. When the fourth electrode is provided and a plurality of bumps are formed on the first electrode and/or the fourth electrode in the MEMS switch of the present invention, it is preferable that the bumps are formed similarly.

When the fourth electrode is provided in the MEMS switch of the present invention, it is preferable that the third electrode and the fourth electrode are located such that they sandwich the electrical contact, and it is more preferable that they are symmetrically located such that the electrical contact is on a center line of symmetry, when viewed from above. Such a construction makes it possible to apply uniform contact force having no bias to the entire electrical contact, avoiding the dispersion of the contact force.

In the MEMS switch of the present invention, the first electrode at the electrical contact is preferably located at a higher position than the first electrode at the bump. Such a construction makes it possible to maintain also the contact force conferred by the spring force after the contact is made.

The present invention also provides a communication device including the MEMS switch of the present invention. The communication device of the present invention is highly reliable and can be driven by low power, due to the high reliability and the low insertion loss of the switch.

The MEMS switch of the present invention realizes the formation of the electrical contact of high reliability which was difficult to realize in the conventional MEMS switch.

DETAILED DESCRIPTION OF INVENTION

Hereinafter, embodiments of the present invention will be described in detail with reference to the accompanying drawings.
(First Embodiment)

Figure 1:
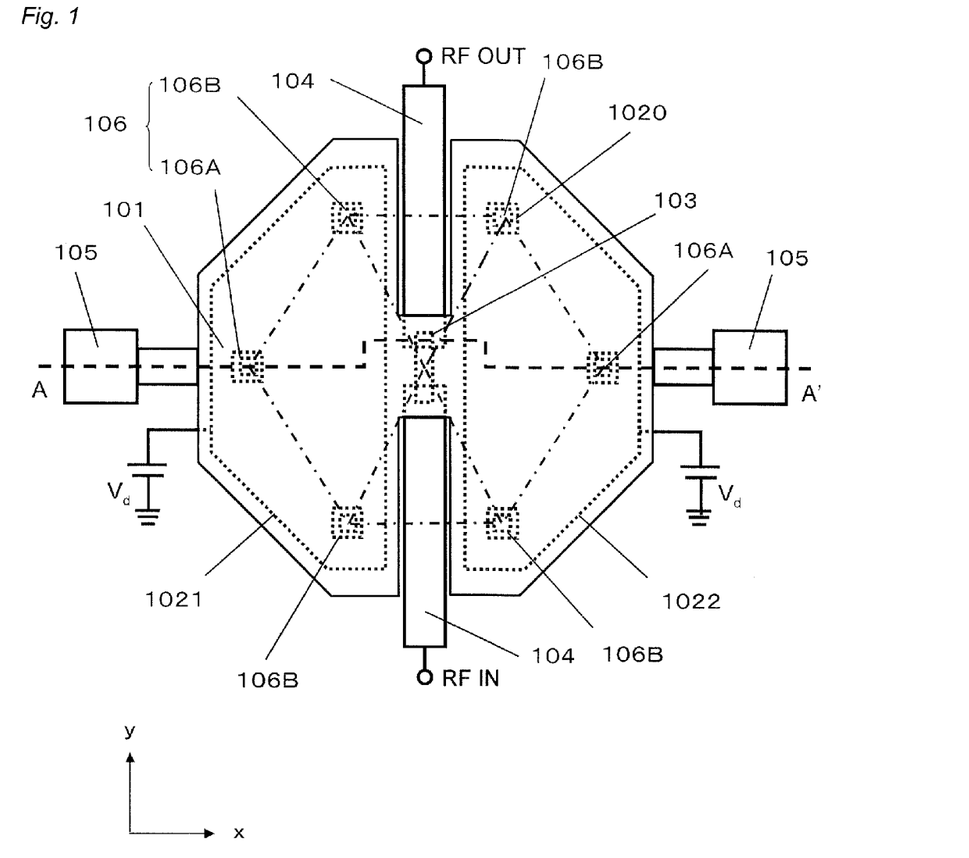
FIG. 1 is a top view showing a construction of a MEMS switch according to a first embodiment of the present invention.
Figure 2:
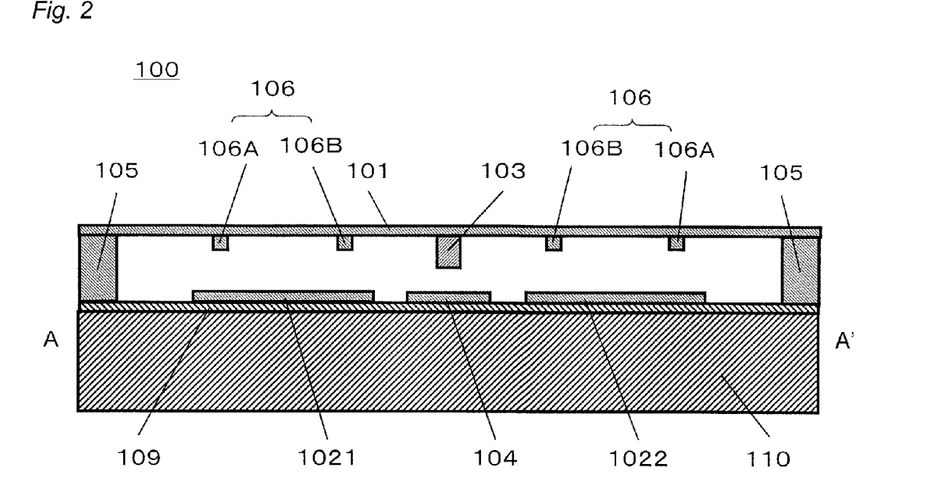
FIG. 2 is a cross-sectional view along a line A-A' in FIG. 1 showing a construction of the MEMS switch in "off" state.
Figure 3:
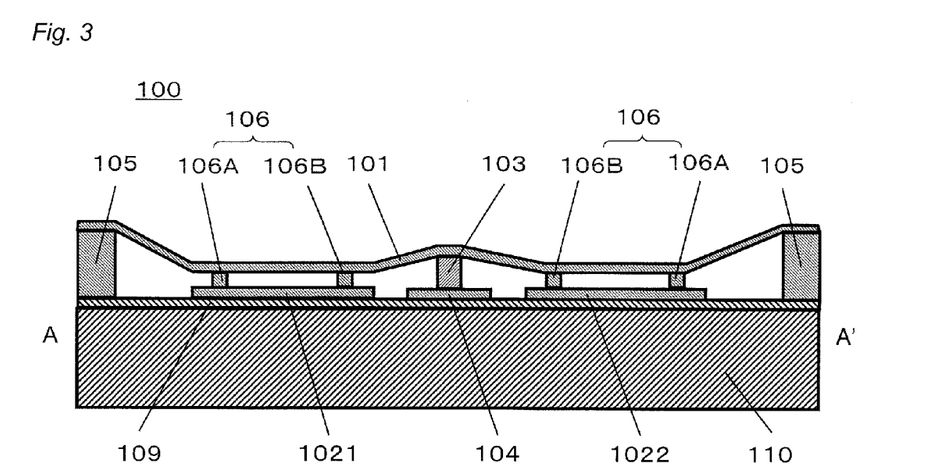
FIG. 3 is a cross-sectional view along a line A-A' in FIG. 1 showing a construction of the MEMS switch in "on" state.

FIG. 1 is a top view showing a construction of a MEMS switch according to a first embodiment of the present invention. FIG. 2 shows a cross-sectional view along a A-A' line in FIG. 1 showing a construction of the MEMS element in "off" state. FIG. 3 shows a cross-sectional view along the line A-A' in FIG. 1 showing a construction of the MEMS switch in "on" state.

The MEMS switch 100 shown in FIGS. 1 to 3 is a series-type. In this switch, an insulating layer 109 is provided, which is to be an interlayer insulating film, on a substrate 110, and on the insulating layer 109, a driving electrode 1021 as a third electrode, a driving electrode 1022 as a fourth electrode and a signal electrode 104 as a second electrode which becomes a transmission path of a signal are formed. A movable electrode 101 of a fixed-fixed beam type as a first electrode is provided, which is bridged by two supports 105 such that it is opposed to and separated from these electrodes. The movable electrode 101 is a deformable member, and can be referred to as a movable part. In the movable electrode 101, a contact electrode 103 which is to contact with the signal electrode 104, and bumps 106 (106A, 106B) which are to contact with the driving electrodes 1021, 1022 are arranged.

Next, a mechanism of switching in the MEMS switch 100 is described.

When the switch is in the "off" state, a driving voltage $V_d$ is not applied between the movable electrode 101 and the driving electrodes 1021, 1022. The movable electrode 101 is located in an initial position where the electrode 101 is not displaced, and the contact electrode 103 is in a state of out-of-contact with the signal electrode 104. Therefore, a conduction path for the signal is not formed between the signal electrode 104 on an input port side (IN) and that on an output port side (OUT). More specifically, since an electrostatic capacitance $C_C$ formed with an air gap interposed between the signal electrode 104 and the contact electrode 103 is made a small value, the state of high AC impedance is established when a radio-frequency signal is transmitted. As a result, an electric power of the radio-frequency signal decays significantly, which causes the state wherein the radio-frequency signal cannot be transmitted between the signal electrode 104 on the input port side and that on the output port side.

When the switch is made "on" state, the driving voltage $V_d$ is applied between the movable electrode 101 and the driving electrodes 1021, 1022. That causes electrostatic force to act so that the movable electrode 101 is attracted to the substrate 110 side, and the contact electrode 103 and the signal electrode 104 electrically contact with each other. When the contact between the contact electrode 103 and the signal electrode 104 is of a resistively-coupled type due to a metal-to-metal contact, the resistance $R_C$ results in a low value, and the conduction path of the signal is formed, and the signal is transmitted from the signal electrode 104 on the input port side to the signal electrode 104 on the output port side through the contact electrode 103.

When switching from the "on" state to the "off" state, electric potentials of the movable electrode 101 and of the driving electrodes 1021, 1022 are adjusted to be the same to eliminate the electrostatic force and the spring force of the movable electrode 101 returns the electrode 101 to its initial position. In this manner, opening and closing of the signal transmission path is performed.

Figure 4:
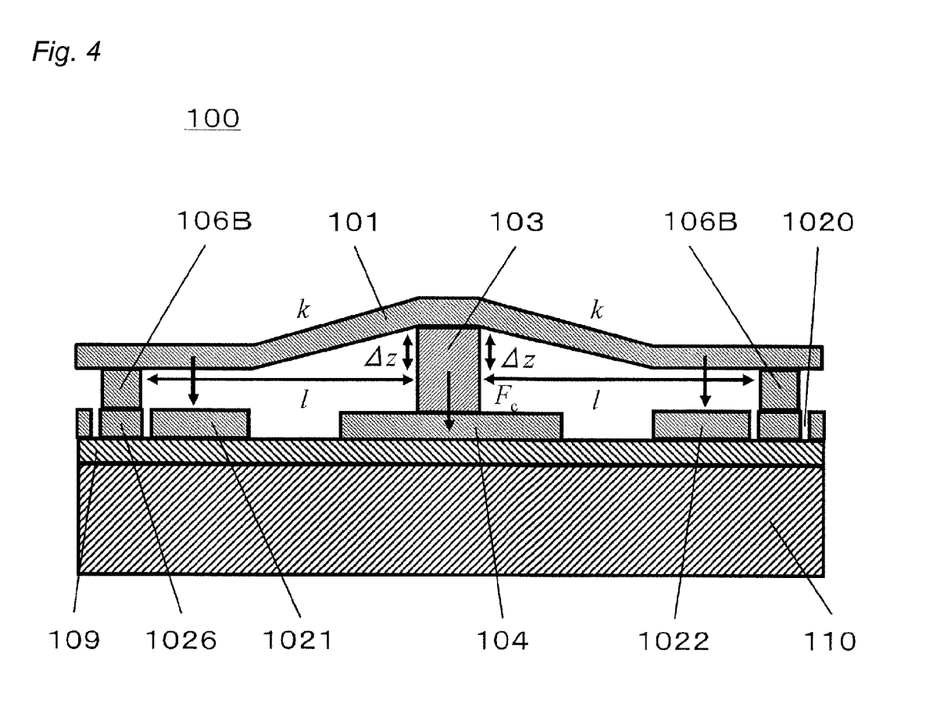
FIG. 4 is a cross-sectional view along a line A-A' in FIG. 1 showing a construction near an electrical contact in "on" state.

FIG. 4 is a cross-sectional view along a line A-A' in FIG. 1 showing the construction near the electrical contact when MEMS switch of the present embodiment is in the "on" state.

In the "on" state, the bumps 106 provided on the movable electrode 101 make contact with floating-island electrodes 1026. The floating-island electrodes 1026 are a layer which is made from the same material and have the same thickness as the driving electrodes 1021, 1022, and parts separated physically and electrically by slits 1020. Because of the presence of the floating-island electrodes 1026, the movable electrode 101 and the driving electrodes 1021, 1022 do not have the same electric potential, and therefore, the electrostatic force can be maintained. In addition, according to the method of forming the floating-island electrodes 1026 by the slits 1020, a simplification of the production process can be achieved since the floating island electrodes 1026 can be formed in the same layer as that of the driving electrodes 1021, 1022 in one step. Furthermore, the formation of the floating-island electrodes 1026 makes it possible to form the bumps 106 from the same material as that of the contact electrode 103. The simplification of the production process can be achieved in that point.

A spring constant of the movable electrode 101 after the contact is made depends on a region bridged between a plurality of bumps 106 and the contact electrode 103. The spring constant is increased relative to that in a state of the initial position because of the decrease in the region. The arrangement of the bumps 106 and the contact electrode 103 is set, such that the spring force of the movable electrode after the contact is made is larger than the electrostatic force in order that the movable electrode 101 and the driving electrodes 1021, 1022 do not contact with each other by a second pull-in after the contact is made. Such arrangement forms gaps between the movable electrode 101 and the driving electrodes 1021, 1022 after the contact is made, and establishes point contacts by the bumps 106. That enables the avoidance of the charging in the contact interface due to the direct contact of the movable electrode and the driving electrodes. And that enables the avoidance of the reduction in reliability due to the stiction between the movable electrode and the driving electrodes.

The height of the contact electrode 103 is set higher than that of the gap such that the contact force by the spring force also acts after the electrical contact is formed. In other words, it is preferable to select the heights (or the thicknesses) of the contact electrode 103 and the bumps 106 such that the position of the movable electrode 101 in which the contact electrode is provided is higher than the positions of the movable electrode 101 in which the bumps are provided when viewed from the substrate 110. The height of the contact electrode 103 is preferably higher than those of the bumps 106 since the thickness of the movable electrode 101 is typically constant. The movable electrode 101 of the length 1 bridged between the bumps 106B and the contact electrode 103 applies a spring force $F_s=k\Delta z$, which depends on the deflection spring constant k and the height difference $\Delta z$, to the contact between the contact electrode 103 and the signal electrode 104. A contact force $F_c=F_s+F_e$ is applied to the contact due to the construction in which the gaps are formed between the movable electrode 101 and the driving electrodes 1021, 1022 to continue to apply the electrostatic force $F_e$. It should be noted here that the length l of the movable electrode 101 means the difference between a x-coordinate of the side edge of the movable electrode 101 and the x-coordinate of the side edge of the bump whose x-coordinate of the side edge is closest to the x-coordinate of the side edge of the movable electrode 101 among the x-coordinates of the side edges of a plurality of bumps (that is, a distance in the x direction).

The construction of the present embodiment makes it possible to maintain high contact force by the electrostatic force in addition to the spring force (or the elastic force) even after the contact, which achieves the formation of the high reliable contact which achieves the low contact resistance and the low insertion loss at the low driving voltage.

In addition, the construction of the present embodiment makes it possible to obtain high contact force in the electrical contact, and thus to decrease the physical contact area between the contact electrode 103 and the signal electrode 104 in the MEMS switch. That makes it possible to avoid the decrease in reliability due to the stiction between the contact electrode 103 and the signal electrode 104.

As shown in FIG. 1, the driving electrodes 1021, 1022 are arranged to sandwich the contact electrode 103 therebetween in this embodiment. In other words, the driving electrodes 1021, 1022 are arranged on the both sides of the contact electrode 103 when a direction parallel to the signal electrode 104 (a vertical (top and bottom) direction in FIG. 1) is defined as a longitudinal direction and the direction perpendicular to the longitudinal direction is defined as a width direction.

Furthermore, in the illustrated embodiment, the driving electrodes 1021, 1022 are arranged symmetrically about the signal electrodes 104 and the contact electrode 103 connecting therebetween as a centerline. Such arrangement makes it possible to apply uniform contact force without a bias to the entire contact between the contact electrode 103 and the signal electrode 104, avoiding the dispersion of the contact force. When two driving electrodes are provided, they can be arranged to be asymmetrical as needed. For example, in the case where the electrical contact is rectangular-shaped when viewed from above, the driving electrodes may be arranged on one short side and one long side of the electrical contact, respectively. In other words, two driving electrodes may form an angle, not being parallel to each other.

In the illustrated embodiment, the bumps 106 are arranged to be symmetrical about the signal electrodes 104 and the contact electrode 103 connecting therebetween as a centerline when viewed from above. Such arrangement makes the gaps formed on the both sides of the contact electrode 103 symmetrical, which contributes to the exertion of the same electrostatic force on the both sides of the contact electrode 103 and the application of the uniform contact force without bias to the electrical contact. The bumps 106 may be arranged to be asymmetrical as needed, or may be arranged to be opposed to only one driving electrode as needed.

As shown in the figure, it is preferable to provide a plurality of bumps 106 and to arrange the bumps in the positions different from each other such that the distances between the respective bumps 106 and the electrical contact are the same. In the illustrated embodiment, the bumps 106 which are to contact with the driving electrodes 1021 and 1022 are provided, and the respective bumps 106 are arranged on the circumference of the circle, the center of which is the electrical contact. As shown in the figure, the distance between the electrical contact and the bump means the distance between the center of the signal electrode 103 and the bump 106 when the electrical contact and the bumps make the surface contact. By arranging the bumps in such manner, the movable electrode 101 bridged over the region surrounded by the electrical contact and the bumps is supported in not only the x direction but also the y direction. That increases the spring force of the movable electrode 101 to prevent the movable electrode 101 from being pulled against the driving electrodes 1021, 1022. As a result, the gaps between the movable electrode 101 and the driving electrodes 1021, 1022 can be ensured.

The bumps 106 are preferably arranged such that, when viewed from above, the area of the region which is formed by connecting, by a line, the center of the electrical contact (the center of the surface contact (the signal electrode 103) when the surface contact is made as shown in the figure) and the bumps (centers of the bumps), that is, a region surrounded by the chain line in FIG. 1 is 20% or more of the area in which the electrostatic force acts between the movable electrode 101 and the driving electrodes 1021, 1022. That ensures the wide gap regions formed by the driving electrodes 1021, 1022 and the movable electrode 101 bridged between the bumps 106 and the contact electrode 103 after the contact is made. Widened gap regions decrease the spring force of the movable electrode 101, and increase the areas where the movable electrode 101 and the driving electrodes 1021, 1022 are opposed to each other in the gap regions to increase the electrostatic force. That makes it possible to continue to apply the electrostatic force to the contact even after the contact is made.

For example, in the embodiment shown in the figure, the distance from the electrical contact to each bump can be set at most 0.3 mm when the total area of the two driving electrodes is 1 mm², the driving voltage is 7 V, the thickness of the movable electrode is 8 μm, and the gaps of 0.2 μm are to be formed between the driving electrodes and the movable electrode after the contact electrode 103 contacts with the signal electrode 104. In this case, the total area of the regions surrounded by the electrical contact and the bumps is 0.23 mm², corresponding to 23% of the areas in which the electrostatic force acts between the movable electrode and the driving electrodes.

The number and the positions of the bumps 106 are selected in view of the properties and the size and so on of the movable electrode 101. The bumps are preferably arranged such that they are not located near the electrical contact and are located on the periphery of the driving electrodes 1021, 1022. That makes it possible to increase the area of the region in which the electrostatic force acts between the movable electrode 101 and the driving electrode 1021. In this embodiment, the bumps 106 are arranged on the approximate vertices of the driving electrodes 1021, 1022 which are approximate triangles when viewed from above, increasing the region surrounded by the electrical contact and the bumps as much as possible. As a result, the gap regions are large and the electrostatic capacitance is increased so that the electrostatic force can be increased which is force that maintains the contact between the contact electrode 103 and the signal electrode 104 after the contact is made.

Further, it is preferable to form the bumps 106, selecting the number and the positions of the bumps such that the movable electrode 101 does not contact directly with the driving electrodes 1021, 1022. The contact force by the electrostatic force cannot be obtained when the movable electrode and the driving electrodes contact each other. It is preferable to significantly warp the movable electrode by adjusting the distance between the bump and the movable electrode and the distance between the bumps, since the larger spring force can be obtained as $\Delta Z$ is larger as described above. However, the electrostatic force $F_e$ cannot be obtained when these distances are too large so that the warped movable electrode contacts the driving electrodes. To avoid that, it is preferable to set the positions and the number of the bumps considering the spring constant and so on of the movable electrode 101.

As described above, according to the MEMS switch 100 of this embodiment, it is possible to provide the microelectromechanical system switch which achieves the highly reliable contact that was previously difficult to achieve, and the electric device using the MEMS switch. This MEMS switch can be used in various electric devices, in particular, a communication device. Particularly, it can be used in the mobile phone, a transmitting and receiving part of a wireless communication terminal and an antenna device.

In the illustrated embodiment, the MEMS switch has a regular octagonal shape when viewed from above. The shape of MEMS switch of the present invention is not limited to this, and the MEMS switch can have another shape such as square, regular hexagon, circle, oval, rectangular or triangle.

The present invention can apply to a switch, wherein a contact part between the movable electrode and the signal electrode in which the signals are coupled on an equivalent circuit of the MEMS switch is connected in parallel to the transmission line, and the edge of the contact part is connected to ground (a shunt-type switch). In the shunt-type switch, the positions of the movable electrode in the "on" state and the "off" state are opposite to those of the series type switch. In the "off" state, the movable electrode makes contact with the signal electrode. Signals are transmitted to the ground, and not to the output port. In the "on" state, the movable electrode does not make contact with the signal electrode, and signals are transmitted through the signal electrode from the input port to the output port.

In addition, in another embodiment of the present invention, the movable electrode can be of a cantilever-type. When the movable electrode is of a cantilever type, only one driving electrode may be arranged as shown in FIG. 5. That is, the MEMS switch of the present invention may be of the construction wherein one driving electrode as the third electrode is included.

In further another embodiment of the present invention, the bumps which are provided on the movable-electrode side in the first embodiment may be provided on the driving-electrode side.

In yet another embodiment of the present invention, the bumps may be made from the insulator. In this case, the movable electrode and the driving electrode are prevented from having the same potential even if the floating-island electrodes are not provided within the driving electrode.

A production method of the MEMS switch of any embodiment (including the following embodiment(s)) is not especially limited to a specific one. For example, the movable electrode can be formed to be of a fixed-fixed beam type or a cantilever type by etching with a sacrifice layer. The contact electrode is formed by forming a concave in the sacrifice layer by etching and then deposing a material of the contact electrode within the concave, which material may be the same as that of the movable electrode. When the bumps are formed on the movable electrode, the movable electrode with bumps is formed by forming, in the sacrifice layer, concaves different from that for forming the contact electrode by masking and etching, depositing the material of the movable electrode within the concaves and on the surface of the sacrifice layer, and then removing the sacrifice layer. The material of the bumps may be different from that of the movable electrode, for example, an insulator. The insulating layer may be formed by thermally oxidizing the surface of the substrate made from silicon. The thickness of the insulating layer may be, for example, about 1 μm.

The driving electrodes as the third electrode and the fourth electrode and the signal electrode as second electrode are formed by depositing the respective electrode materials on the insulating layer, and patterning by masking and etching. The thicknesses of the driving electrodes as the third electrode and the fourth electrode and the signal electrode as the second electrode may be about 0.5 to 1.0 μm. When the floating-island electrodes are formed within the third and the fourth electrodes, those are formed by making slits in the same mask, and separating the floating-island electrodes from the third and the fourth electrodes by the etching process.

(Second Embodiment)

Figure 7:
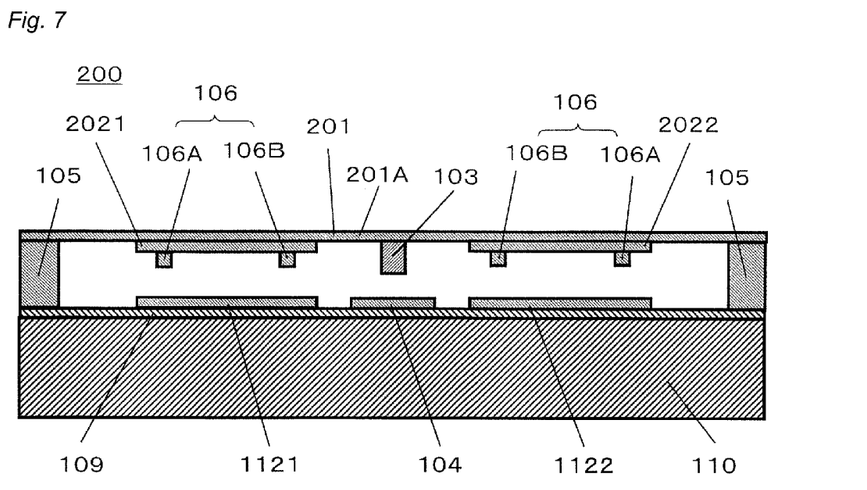
FIG. 7 is a cross-sectional view showing a construction of a MEMS switch according to a second embodiment of the present invention.

The embodiment in which the driving electrodes 1021 and 1022 are constructed as the third and the fourth electrodes is described in the first embodiment. The construction in which the driving electrodes are provided on the side of the movable electrode as the first electrode is shown as a second embodiment. FIG. 7 is a cross-sectional view showing the construction of the MEMS switch of the second embodiment. The top view of this MEMS switch is approximately the same as that of the first embodiment (i.e. FIG. 1), and FIG. 7 shows the A-A' cross section in FIG. 1.

In the MEMS switch 200 shown in FIG. 7, the insulating layer 109 which is to be an interlayer insulating film 109 is provided on the substrate 110, and two counter electrodes 1121 and 1122 as the third and the fourth electrodes and the signal electrode as the second electrode which is to be the transmission path of the signal are provided on the insulating layer 109. A movable electrode 201 of the fixed-fixed beam as the first electrode is provided, which is bridged with two supports 105 such that it is opposite to these electrodes and separated from these electrodes. In the illustrated embodiment, the movable electrode consists of two layers, one layer being a bridging layer 201A bridged by the supports and the other layer being a driving electrode layer 2021 and 2022 which is a layer for applying the voltage.

In the movable electrode 201, the contact electrode 103 which is to make contact with the signal electrode 104 is provided and the bumps 106 (106A, 106B) which are to contact with the counter electrodes 1121 and 1122 are provided. The electrostatic force between the movable electrode 201 and the counter electrodes 1121 and 1122 is generated by applying the voltage to the driving electrode layers 2021 and 2022 of the movable electrode 201. The contact electrode 103 and the signal electrode 104 make electrical contact by applying the voltage. At this time, the bumps 106 make contact with the counter electrodes 1121, 1122 to avoid the direct contact between the driving electrode layer of the movable electrode and the counter electrode.

The mechanism of the switching in the MEMS switch 200 is as described in connection with the first embodiment except that the voltage is applied to the driving electrode layers 2021 and 2022. Therefore, the detailed description thereof is omitted. In addition, also in this embodiment, it is preferable to construct the counter electrodes 1121 and 1122 such that the bumps 106 make contact with the floating-island electrodes. Further, preferable construction of each member described in connection with the first embodiment can be also preferably employed also in this embodiment. Furthermore, effects achieved in the MEMS switch of this embodiment are also as described in connection with the first embodiment.

(Third Embodiment)

The switches in which the movable electrodes are of fixed-fixed beam type are described in the first and the second embodiments. Now, an embodiment in which the movable electrode is of cantilever type is described as a third embodiment. In the MEMS switch shown in FIG. 8, an insulating layer 309 which is to be the interlayer insulating layer is provided on a substrate 310, and driving electrodes 302 as the third electrode and a signal electrode 304 as the second electrode which is to be the transmission path of signals are formed on the insulating layer 309. A movable electrode 301 having a contact electrode 303 is provided, which is supported by supports 305 such that it is opposed to these electrodes and separated from these electrodes. Bumps 306 (306A, 306B) are provided on the movable electrode 301.

Figure 8:
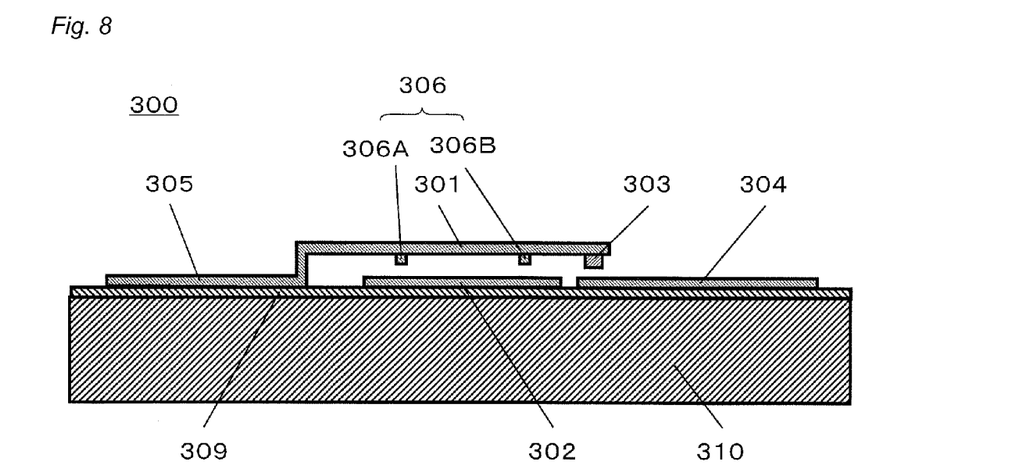
FIG. 8 is a cross-sectional view showing a construction of a MEMS switch according to a third embodiment of the present invention.

The mechanism of the switching in the MEMS switch 300 is as described in connection with the first embodiment. Specifically, the voltage is applied to the driving electrode 302 to contact the contact electrode 303 with the signal electrode 304 by the electrostatic force. At this time, the bumps 306 provided on the movable electrode 301 make contact with the driving electrode 302 so that the direct contact between the movable electrode and the driving electrode are avoided. Also in this embodiment, it is preferable to construct the driving electrode 302 such that the bumps 306 make contact with the floating-island electrodes. In addition, the preferable construction of each member described in connection with the first embodiment can be preferably employed also in this embodiment. Further, the effects achieved in the MEMS switch of this embodiment are also as described in connection with the first embodiment.

(Fourth Embodiment)

As a fourth embodiment, another embodiment is described in which the movable electrode is of cantilever type. In the MEMS switch 400 shown in FIG. 9, the insulating layer 309 which is to be the interlayer insulating film is provided on the substrate 310, the driving electrodes 3021 and 3022 as the third and the fourth electrodes and the signal electrode 304 as the second electrode which is to be the transmission path of signal are provided on the insulating layer 309. The movable electrode 301 (the first electrode) having the contact electrode 303 is provided, which is supported by the supports 305 such that it is opposed to and separated from these electrodes. The bumps 306 (306A, 306B) are provided in the movable electrode.

Figure 9:
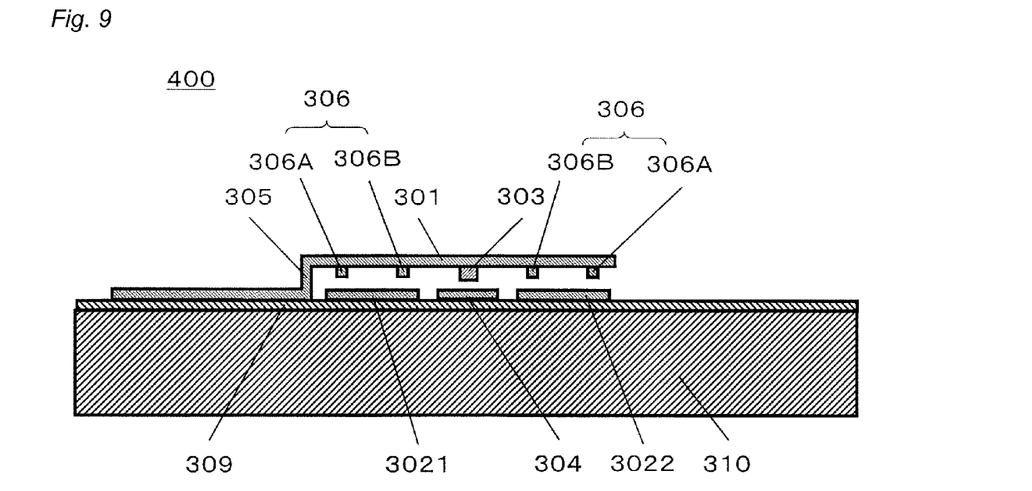
FIG. 9 is a cross-sectional view showing a construction of a MEMS switch according to a fourth embodiment of the present invention.

The mechanism of the switching in the MEMS switch 400 is as described in connection with the first embodiment. Particularly, when the voltage is applied to the driving electrodes 3021 and 3022, the contact electrode 303 makes contact with the signal electrode 304 by the electrostatic force. At this time, the bumps 306 provided on the movable electrode 301 make contact with the driving electrodes 3021 and 3022 so that the direct contact between the movable electrode and the driving electrodes is avoided. Also in this embodiment, it is preferable to construct the driving electrodes 3021 and 3022 such that the bumps 306 make contact with the floating-island electrodes. In addition, the preferable construction of each member described in connection with the first embodiment can be preferably employed also in this embodiment. Further, the effects achieved in the MEMS switch of this embodiment are also as described in connection with the first embodiment.

The MEMS switch of the present invention can achieve the high reliability and the low insertion loss, and thus, it is useful as a part of an electric device such as a communication device.

REFERENCE SIGNS LIST 100, 200, 300, 400, 500 MEMS switch
101, 201, 301 Movable electrode
1020 Slit
1021, 1022, 302, 3021, 3022 Driving electrode
1026 Floating-island electrode
103, 303 Contact electrode
104, 304 Signal electrode
105, 305 Support
106, 106A, 106B, 306, 306A, 306B Bump
109, 309 Insulating layer
110, 310 Substrate
201A Bridging layer
2021, 2022 Driving electrode layer
1121, 1122 Counter electrode
501 Movable electrode
502 Driving electrode
503 Contact electrode
505 Support
509 Insulating layer

The invention claimed is:
1. A MEMS switch, comprising:
a first electrode; and
a second electrode, a third electrode and a fourth electrode which are separated from and opposed to the first electrode,
wherein an electrical contact can be made between the first electrode and the second electrode by electrostatic force generated between the first electrode and the third electrode and between the first electrode and the fourth electrode,
a bump which can form a contact between the first electrode and the third electrode is provided on the first electrode, another bump which can form a contact between the first electrode and the fourth electrode is provided on the first electrode, and a gap is formed between the first electrode and the third electrode and between the first electrode and the fourth electrode when the electrical contact is made between the first electrode and the second electrode, and wherein the bump and a floating-island electrode formed within the third electrode can form the contact, the other bump and other floating-island electrode formed within the fourth electrode can form the contact, the third electrode and the fourth electrode are separated from each other, and, the third electrode and the fourth electrode are placed so as to sandwich the electrical contact when viewed from above.

2. The MEMS switch according to claim 1, wherein a number and position(s) of the bump(s) are selected so that the first electrode and the third electrode do not contact directly with each other when the electrical contact is formed.

3. The MEMS switch according to claim 1, wherein further comprising a plurality of the bumps, each of the bumps being placed on each of a plurality of lines which radiate from the electrical contact.

4. The MEMS switch according to claim 3, wherein the bumps are placed so that distances between the electrical contact and the respective bumps are equal.

5. The MEMS switch according to claim 1, further comprising a plurality of the bumps, wherein a number and positions of the bumps are selected so that an area of a region enclosed by the electrical contact and the bumps is 20% or more of an area where electrostatic force acts between the first electrode and the third electrode.

6. The MEMS switch according to claim 1, wherein the bump(s) is of an electrical insulator.

7. The MEMS switch according to claim 1,
wherein a bump which can form a contact between the first electrode and the fourth electrode is formed on one or more electrodes selected from the first electrode and the fourth electrode, and a gap is formed between the first electrode and the third electrode and between the first electrode and the fourth electrode when the electrical contact is made between the first electrode and the second electrode.

8. The MEMS switch according to claim 7, wherein a number and position(s) of the bump(s) are selected so that the first electrode and the fourth electrode do not contact directly with each other when the electrical contact is formed.

9. The MEMS switch according to claim 7, further comprising a plurality of the bumps, each of the bumps being placed on each of a plurality of lines which radiate from the electrical contact.

10. The MEMS switch according to claim 9, wherein the bumps are placed so that distances between the electrical contact and the respective bumps are equal.

11. The MEMS switch according to claim 7, further comprising a plurality of the bumps, wherein a number and positions of the bumps are selected so that an area of a region enclosed by the electrical contact and the bumps is 20% or more of an area where the electrostatic force acts between the first electrode and the fourth electrode.

12. The MEMS switch according to claim 7, wherein the bump(s) is of an electrical insulator.

13. The MEMS switch according to claim 1, wherein the first electrode at the electrical contact is positioned at a higher level than the first electrode at the bump.

14. The MEMS switch according to claim 13, wherein a contact electrode is formed on the first electrode at the electrical contact, and a height of the contact electrode is larger than a height of the bump.

15. A communication device comprising the MEMS switch according to claim 1.

16. A communication device comprising the MEMS switch according to claim 1.

* * * * *